（12）United States Patent
Pentel

(10) Patent No.: US 8,123,130 B2
(45) Date of Patent: *Feb. 28, 2012

(54) REMOTE ORDERING DEVICE

(75) Inventor: Randolph M. Pentel, Mendota Heights, MN (US)

(73) Assignee: Remote Inc., St. Paul, MN (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/765,272

(22) Filed: Jun. 19, 2007

(65) Prior Publication Data

US 2007/0239565 A1 Oct. 11, 2007

Related U.S. Application Data

(63) Continuation-in-part of application No. 10/889,602, filed on Jul. 12, 2004, now Pat. No. 7,234,640, which is a continuation-in-part of application No. 10/222,158, filed on Aug. 16, 2002, now Pat. No. 6,880,750, which is a continuation-in-part of application No. 09/684,185, filed on Oct. 6, 2000, now Pat. No. 6,435,406, which is a continuation-in-part of application No. 09/384,961, filed on Aug. 27, 1999, now Pat. No. 6,425,524, which is a continuation-in-part of application No. 09/062,093, filed on Apr. 17, 1998, now Pat. No. 5,969,968.

(51) Int. Cl.
*G07B 15/02* (2006.01)
(52) U.S. Cl. .................. 235/384; 235/379; 235/472.01; 235/462.44
(58) Field of Classification Search ............. 235/462.45, 235/462.44, 472.01, 472.02, 472.03, 379, 235/384
See application file for complete search history.

(56) References Cited

U.S. PATENT DOCUMENTS 5,091,961 A * 2/1992 Baus, Jr. ...................... 382/139
5,664,110 A 9/1997 Green
5,838,798 A 11/1998 Stevens, III
(Continued)

FOREIGN PATENT DOCUMENTS

DE 19638251 3/1998
(Continued)

OTHER PUBLICATIONS

Eur Pt App No. 00959361.7, May 27, 2009, Pentel Off. Action.

*Primary Examiner* — Karl D. Frech
(74) *Attorney, Agent, or Firm* — Mark A. Mersereau

(57) ABSTRACT

A remote ordering device having a two-way wireless communications input device with a display for sending and receiving data and a data receiving station to send and receive data, process orders and keep track of accounts, inventory and retain other data as required. The receiving station can be in communication with other receiving stations to forward orders or data. The receiving station can provide instructions to a person or machine to fill orders at any desired location. The remote ordering device can scan in checks or present an electronic version of a check to the data receiving station for payment through an automated clearing house. The two-way communications can be by cell phone through a telephone network alone or also through the internet to the data receiving station. The communications can also be through Wi-Fi and the internet and use a PDA or a computer for data input and reading.

20 Claims, 10 Drawing Sheets

U.S. PATENT DOCUMENTS

| | | |
|---|---|---|
| 5,845,263 A | 12/1998 | Camaisa |
| 5,905,248 A | 5/1999 | Russell et al. |
| 6,425,524 B2 | 7/2002 | Pentel |
| 6,435,406 B1 | 8/2002 | Pentel |
| 6,473,739 B1 | 10/2002 | Showghi et al. |
| 6,873,970 B2 | 3/2005 | Showghi et al. |
| 6,880,750 B2 * | 4/2005 | Pentel ........................... 235/380 |
| 6,969,968 B2 | 11/2005 | Trongnumchai |
| 7,234,640 B2 | 6/2007 | Pentel |

FOREIGN PATENT DOCUMENTS

| | | |
|---|---|---|
| GB | A-1424379 | 10/1973 |
| GB | 2196766 | 5/1988 |
| JP | 63-059199 | 3/1988 |
| JP | 04-253695 | 9/1992 |
| JP | 06-215271 | 8/1994 |
| JP | 08-263561 | 10/1996 |
| JP | 08-335294 | 12/1996 |
| JP | 2633267 | 7/1997 |
| JP | 10-187820 | 7/1998 |
| JP | 10-261169 | 9/1998 |
| JP | 11-19185 | 7/1999 |
| JP | 11-239097 | 8/1999 |
| JP | 11-259573 | 9/1999 |
| JP | 2000-113331 | 4/2000 |
| JP | 2000-209146 | 7/2000 |
| JP | A-2001-29100 | 10/2001 |
| JP | A-2002-189789 | 7/2002 |
| JP | A-2002-216251 | 8/2002 |
| JP | 2004-511050 | 4/2004 |
| JP | 2002-533205 | 2/2007 |
| JP | 2004-529352 | 2/2009 |
| JP | 2001-520366 | 7/2009 |
| WO | WO 00-49551 | 8/2000 |

* cited by examiner

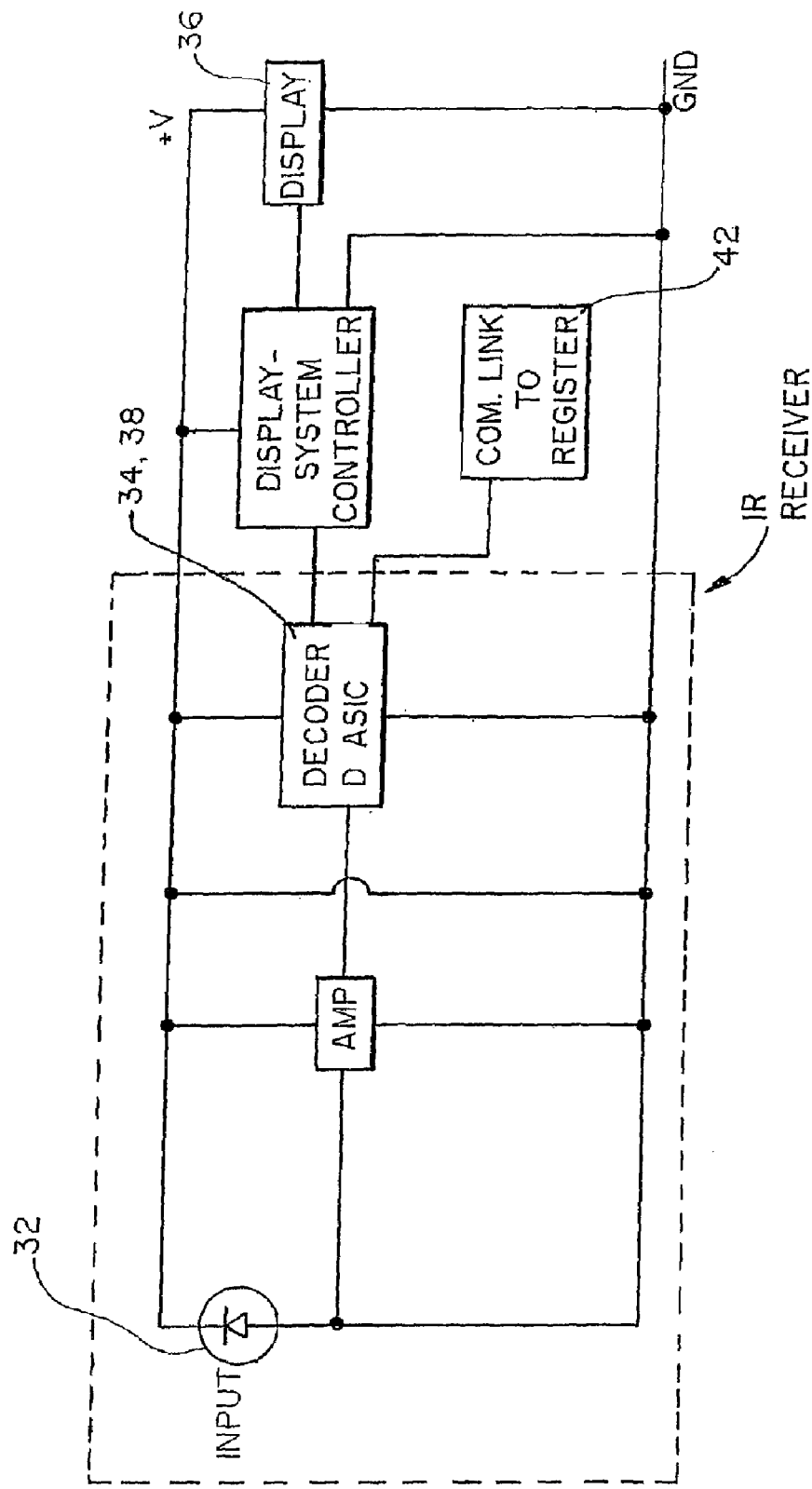

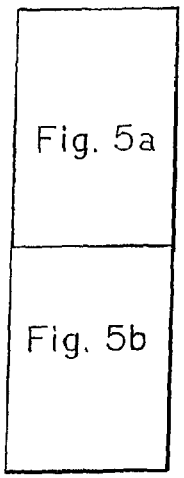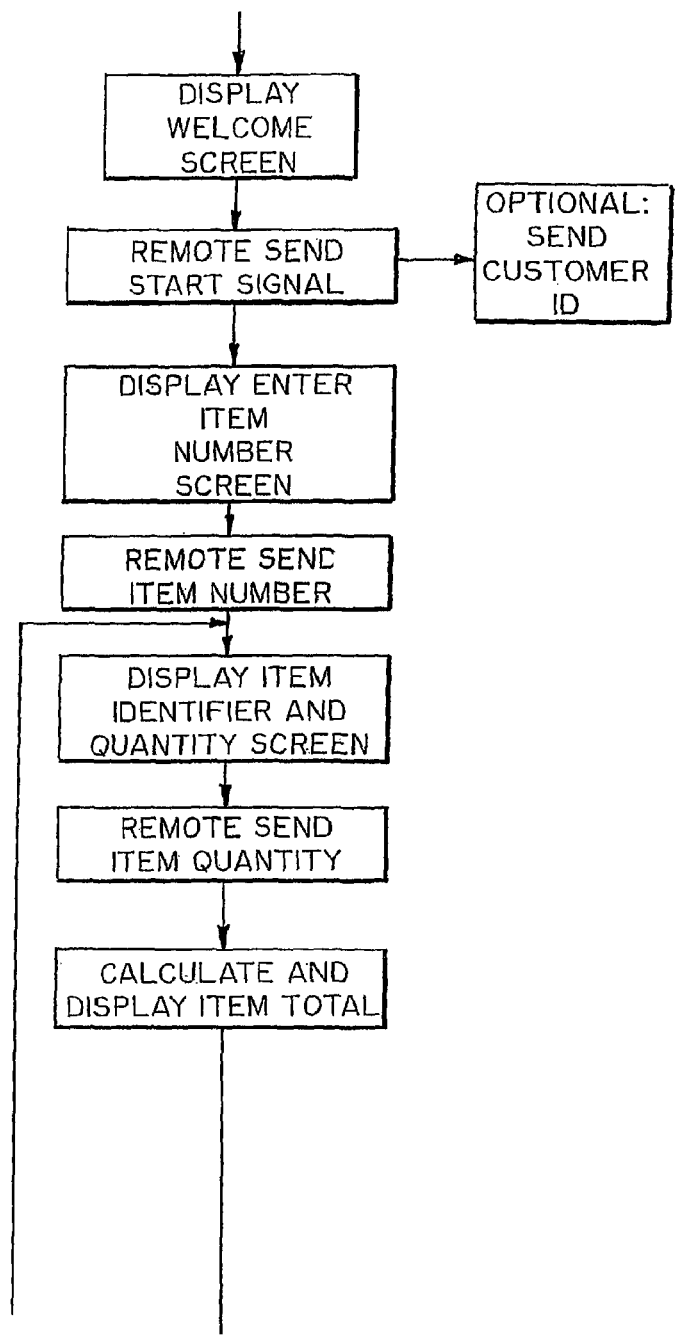

Fig. 6a

ENTER ITEM NUMBER

ENTER ITEM NUMBER 1 2

PRESS ENTER BUTTON

Fig. 7

HAMBURGER QUANTITY 0 2

PRESS ENTER

Fig. 8

1. HAMBURGER - 2
TOTAL:

$1.75

PRESS ENTER BUTTON

Fig. 9

PRESS ENTER TO ORDER ITEM
PRESS REMOVE TO REMOVE ITEM
PRESS FINISH TO END $1.75

Fig. 10

YOUR TOTAL IS:

$4.73

PLEASE PULL FORWARD

Fig. 11a

| ITEM | SELECTION | COUNT |
|---|---|---|
| 01 | HAMBURGERS | 2 |
| 02 | FRENCH FRIES | 2 |
| 03 | MILK SHAKE | 1 |

|  |  |
|---|---|
| SUBTOTAL | $4.35 |
| TAX | $0.28 |
| TOTAL | $4.73 |

ENTER ITEM NUMBER TO REMOVE

<u>0</u>  <u>1</u>

PRESS ENTER BUTTON

Fig. 11b

| ITEM | SELECTION | COUNT | SUBTOTAL |
|---|---|---|---|
| 01 | HAMBURGERS | 2 | $2.05 |
| 02 | FRENCH FRIES | 2 | $1.30 |
| 03 | MILK SHAKE | 1 | $1.00 |
|  | SUBTOTAL |  | $4.35 |
|  | TAX |  | $0.28 |
|  | TOTAL |  | $4.73 |

ENTER ITEM NUMBER TO REMOVE

<u>0</u>  <u>1</u>

PRESS ENTER BUTTON

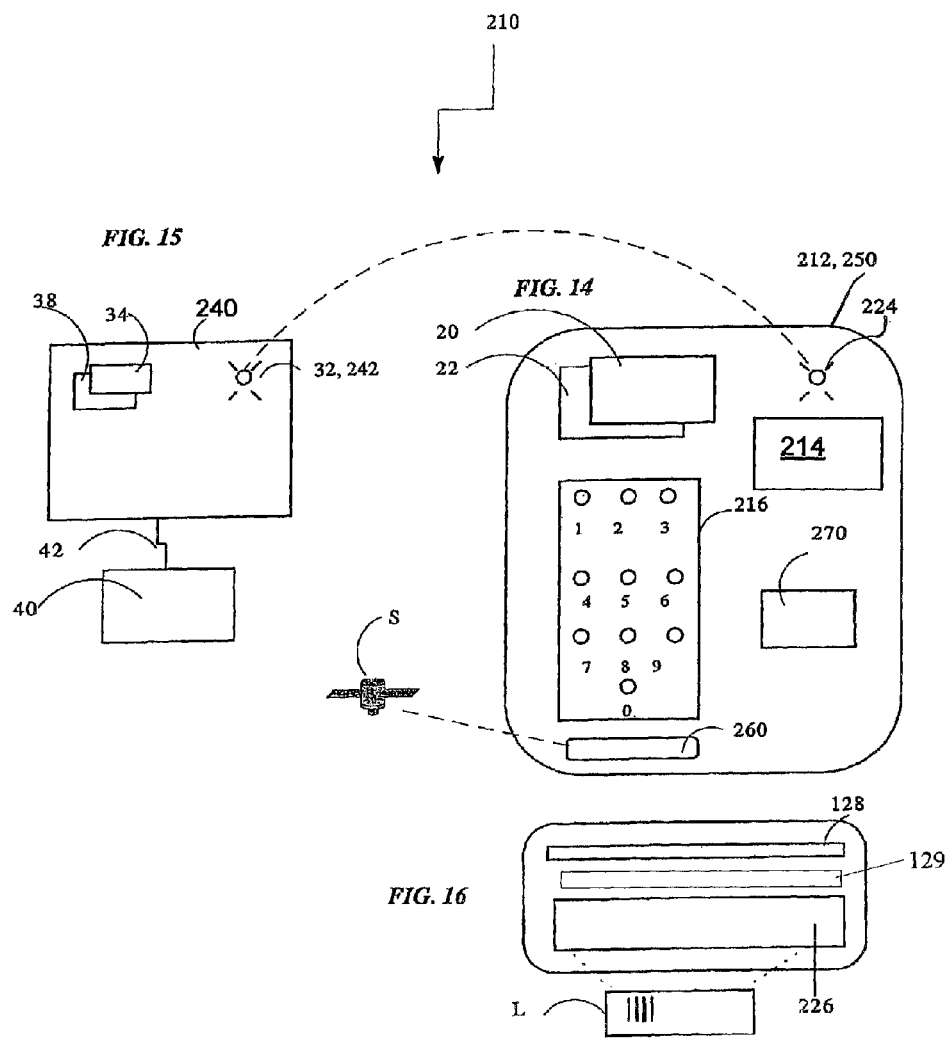

REMOTE ORDERING DEVICE

This is a continuation-in-part of application Ser. No. 10/889,602 filed Jul. 12, 2004 now U.S. Pat. No. 7,234,640 which is a continuation-in-part of application Ser. No. 10/222,158 filed Aug. 16, 2002 and issued as U.S. Pat. No. 6,880,750, which is a continuation-in-part of application Ser. No. 09/684,185 filed Oct. 6, 2000 and issued as U.S. Pat. No. 6,435,406, which is a continuation-in-part of application Ser. No. 09/384,961 filed Aug. 27, 1999 and issued as U.S. Pat. No. 6,425,524, which is a continuation-in-part of application Ser. No. 09/062,093 filed Apr. 17, 1998 and issued as U.S. Pat. No. 5,969,968.

Claims 1-5 of this application have subject matter disclosed in Ser. No. 09/384,961 filed on Aug. 27, 1999 now U.S. Pat. No. 6,425,524 issued Jul. 30, 2002.

Claims 6-10 of this application have subject matter disclosed in Ser. No. 10/222,158 filed on Aug. 16, 2002 now U.S. Pat. No. 6,880,750 issued Apr. 19, 2005.

BACKGROUND OF THE INVENTION

This invention relates to remote ordering systems in general.

The drive-through lanes in many restaurants have added a very beneficial feature for both the consumer and the proprietor. The drive-through allows the proprietor to remain open longer, while the restaurant is being cleaned for the next day. The drive-through also allows more efficient handling of customers with a reduction in staff count.

The customer gets the benefit of staying in his or her vehicle while being serviced. That is especially important to young families and to those with mobility problems, such as the aged or infirm.

Drive-through lanes have been around for quite some time. However, in the typical drive-through lane, a customer places an order by speaking into a microphone to an attendant. The quality of these microphones is generally poor, resulting in miscommunication and errors in the order. By the time the customer finds out about the error, he has already waited in line several minutes and must then wait several more minutes for a correct order to be filled. This results in the loss of customer goodwill.

A problem with previous drive-through ordering systems that do not use a microphone is that they require the customer to lean out of the vehicle to press a button on a menu or use a touch screen. This is awkward if not impossible for some people, such as very obese people. Also, this exposes the customer to rain, snow, etc., while the order is being placed. Generally speaking, there is no feedback as to the type, quantity, or total price of items ordered, and no capability to back up to correct an incorrectly entered item.

There is a need for a remote ordering system for a drive-through lane that addresses the above problems. Additionally, the system should provide a completely transportable, handheld remote device that can be assigned to customers who order frequently from the restaurant. Optimally, the device will have a customer identification, which is transmitted with each order so that the restaurant can perform statistical analysis.

This application also relates to the use of a remote ordering device by wait staff within a restaurant, to place orders, determine the status of orders, and allow the customer to pay the bill either by cash, credit card or by a check or electronic version hereof through automated clearing house rules.

There is a need for a hand held remote device on which a server in a restaurant enters each customer's food and beverage order and then electronically sends the information directly to the kitchen without the server having to personally take the order to the kitchen. Each server can then handle additional tables more efficiently, increasing their income, and saving the restaurant some portion of the staff salaries. The device can also have a credit card reader and signature "box" for the customer to complete the transaction at the table without having to wait in line at the cash register, or for the waitress to return with a credit slip to sign. The device may also have a scanner for imaging checks for electronically paying by check through an automated clearing house.

There is also a need for a generalized remote ordering device for customer use inside or outside a facility such as a restaurant, auto repair facility, retail store, grocery store, airport or other service facility. The remote ordering device is a handheld device that allows the customer to order and pay for products or services and access information.

The generalized remote ordering system may also have two-way communications for seeing what is for sale and ordering on the two-way communications device such as a computer, cell phone or a personal data assistant (PDA) either by a direct dial or over the internet, or by a wide fidelity (Wi-Fi) or other local communication connection such as infrared. With a two-way communications system a display may be used to point and click selections or make selections by a touch screen system or by entering data on a keyboard for selections seen on the display. The communications device can communicate with a computer at a store or restaurant or a service facility or with vending machines, automated teller machines (ATMs), kiosks or vehicles. The device can be used for taxi services to order a taxi to come to your location, particularly when combined with a global positioning system (GPS). The device can also be used to select items and pay for them from vending machines, gasoline pumps at gas stations, to buy airline tickets, insurance, rent cars, contact house appliances or open doors in homes, hotels or other buildings.

The two-way communication feature allows for advertising or other information such as directions or product information to be displayed. Data entry to the communications device can be made by scanning information in, manually entering data, selecting items on a screen by a point and click system or a touch screen system, or by other means such as a radio frequency identification chip (RFIC) reading device.

The user of the communications device can be identified by biometric features of the user, such as fingerprints, voice recognition, retina identification, or by pin numbers or chips such as RFIC in the user's possession implanted in the user.

SUMMARY OF THE INVENTION

A generalized remote ordering apparatus for customer and employee use within a restaurant, auto repair facility, retail store, grocery store, airport, theatre, ATM, hotel, or other service facility, vending machines, kiosks, or vehicles to place orders, determine the status of orders, access information, and allow the customer to pay the bill either by cash when receiving the goods or services, by debiting an account, by use of a credit card, or by check through an automated clearing house comprising:

(a) a data input and transmitting device, such as a cell phone or PDA with a Wi-Fi or cell phone or personal computer (PC) with Wi-Fi or a cell phone for transmitting ordering data through the internet or a phone system or directly to;

(b) an ordering station for receiving data from the transmitting device, either directly or through a cellular telephone system, said ordering station adapted to receive the data from said data input and transmitting device, communicate the order to be filled to an order filling point, account for the transaction by totaling the value of the items or services provided plus any taxes applicable and either presenting the bill for payment, or debiting a credit card, a customer account or by accepting a check or the electronic equivalent through an automated clearing house and optionally providing a receipt for the customer when the goods or services are received. The customer may pick up the goods or they can be delivered to the customer.

A principal object and advantage of the present invention is that it allows the customer to order items from a menu without the necessity of speaking to an attendant. This results in more accurate orders.

Another object and advantage of the present invention is that a server can immediately send orders to a kitchen without having to personally deliver them such that the server can spend more productive time serving patrons, handle more tables and thus save labor expenses.

Another object and advantage of the present invention is that orders are received faster, and the server can be notified of completed orders as soon as they are prepared in the kitchen. Food will not get cool waiting for servers to pick it up.

Another object and advantage of the present invention is that the individual orders will be automatically entered on a computer system, to be used in inventory management, internal control and marketing as desired. If the patron wishes to pay cash, or does not want to use a credit card, the order will be identified electronically at the check out register. If the business establishment wishes to have all patrons come to the check out register for control, the credit card slip and bill could already be completed, saving time at the register.

Another object and advantage of the present invention is that those wishing to pay by check can scan in a check or produce an electronic version of a check and have the check processed through an automated clearing house.

Another object and advantage of the present invention is that restaurant customers who are in a hurry can complete the credit card payment when the food is ordered, and not have to wait for the server to give them the bill. They could leave when they are finished eating.

Another object and advantage is to improve security of transactions by not having credit cards, which can be lost or stolen, or credit card imprints which can be used to steal credit card numbers. Electronic transfer of credit card data and identification information prevents loss by theft.

Another object and advantage of the present invention is that kitchen staff could always read the order because no handwriting is involved.

Another object and advantage of the present invention is that the server's orders and tips could be constantly recorded automatically, even if charged at the table.

Another object and advantage of the present invention is that each server could have their own ordering device for easy identification in the kitchen or for personal notes in the jacket.

Another object and advantage of the present invention is to establish two-way communication from the data input and transmitting device by adding a data receiving portion and a data display portion such as a display screen so that orders can be placed by accessing information on the display screen. The data can be entered by point and click systems, touch screen systems, stylus on screen systems, scanners, radio frequency identification chips or keyboard entry of data.

Another object of the invention is to provide product menus, product information and advertising on the display portion of the two-way communications device.

Another object of the invention is to communicate with machines for providing goods or services from the vending machine, ATMs, kiosks which sell insurance or tickets such as airline tickets, train tickets or theater tickets.

The above objects and advantages would be equally applicable for use by a customer at a service facility such as a restaurant, auto repair facility, retail store, grocery store, airport, etc.

The generalized remote ordering apparatus may also be used by a business facility to allow the customer to select a predetermined order and then enter it remotely. For example, the service facility may post an order code on a World Wide Web page that is correlated to a particular predetermined order. After accessing the web page, the customer enters the order code into the input device and, while at the service facility, transmits the order code to the ordering station. The service facility may also require the customer to enter a credit card number before providing the order code.

The ordering menu can be transmitted to a cell phone, PDA or PC when a telecommunications link is established either directly to the ordering station or through a telephone system or the internet, or the ordering menu may be in the memory of the cell phone PDA or PC. The menu can also be in a catalog or posted in a visible location at the establishment where the ordering is taking place, such as a sign in a drive through lane of a business or on a wall inside of a business establishment. For cell phones, a voice menu can be used to make selections from. Communications can be direct by radio, by Wi-Fi thorough the internet or by cell phone through the internet or a telephone system.

Any type of item or service can be ordered remotely over a cell phone or other telecommunications link, the business receiving the orders can track who is placing the orders by the cell phone being used or the cell phone in combination with a personal identification number (PIN), a biometric identification device attached to the cell phone, PDA or PC, or such a device at the point where the goods or services are delivered. The business can automatically keep track of inventory, and the accounting associated with the transaction such as credit card accounts, or by check or the electronic version thereof by an automated clearing house, debiting accounts the customer has established at the business, preparing receipts, or directing that cash be collected to complete the transaction.

The customer need not remember the number of each business he desires to contact. One number can be provided which has a menu of businesses to contact and the orders may be placed at the number dialed and then transferred to the desired business or a link with the business can be made through the internet or by forwarding the call.

A two-way communications device can provide menus to make selections from. The selections can be made from goods from catalogs, or restaurant menus, or for tickets and seating in theaters, aircraft, hotels reservations, transactions at automatic teller machines, or ordering electronic payments to be made from bank accounts, or by checks through an automated clearing house.

A menu for ordering goods or services may also include a selection of place for picking up the goods or designating a place for delivery.

Identification of the customer can be made by identifying the transmitter device assigned to the customer such as a cell phone number or biometric information collected over the wireless transmitter or in person at the time of pick up or delivery of the goods or services. Other methods of identifying the customer include a PIN or possession of a chip having identification information. Other means of identification of the customer at the point of pickup include signatures, photographs and chips in the possession of the customer such as imbedded chips in a customer card or tag.

A data output device such as a video display or printout can direct personnel at a business establishment to fill orders. The output devices may also be used to print labels, warranties, receipts, credit card slips, tickets or other information for the customer or the business establishment.

Any type of wireless communications can be used such as cell phones, Wi-Fi or other transmitters. The cell phones and transmitters may be connected to PCs, PDAs, tablet PCs or other data storage and manipulation devices. The wireless technology used can be by Wi-Fi, wireless personal networks or other systems. The connections may use BLUETOOTH® protocol or any other protocol. The connection to the work station may be direct by radio or through a phone system or the internet.

Automatic ordering from one computer to another, rather than from a customer directly, can be made. For example, appliances can ask for refills, such as a refrigerator asking a delivery service for more milk, heating system asking for more oil or propane, etc.

The ordering system can also be used to control appliances and controls in homes and businesses, such as turning on lights or security systems, adjusting the heating or cooling systems, etc.

The ordering system working with position location devices such as GPS and cell phone location systems can advice a user where the nearest provider of goods or services is located.

The data entered into the ordering device by the customer may be by pushing buttons, scanning bar codes, scanning checks, voice commands or any other data entry means.

Mobile payments can be made for highway tolls or parking fees, without stopping a vehicle to increase throughput at tollgates and parking ramps. Cab fares, bus fares and other transactions can be completed while in transit.

Two-way communications devices may be used where the remote ordering device has a display screen for displaying data such as ordering menus, product information and advertising. The display screen can be used for point and click ordering, touch screen ordering, stylus on screen ordering or observing the screen and entering data by keyboard from the menu. Other means of entering data to be sent by the ordering device can be by scanning data into the remote ordering device or use of radio frequency identification chips in products manually selected where the bar codes for scanning or the radio frequency chips are attached to the goods or cards for selecting services.

BRIEF DESCRIPTION OF THE DRAWINGS

FIG. 4 is an electrical block diagram of the components of the drive-through station.

FIG. 6A is a schematic of an "enter item number" display.

FIG. 6B shows the "enter item number" display after an item number has been entered.

FIG. 7 is a schematic of an "item identifier and quantity" screen with the item quantity filled in by the customer.

FIG. 8 is a schematic of an "item total" screen.

FIG. 9 is a schematic of an "enter/remove/finish" screen.

FIG. 10 is a schematic of an "order total" screen.

FIG. 11A is a schematic of one embodiment of a "remove item" screen.

FIG. 11B is a schematic of another embodiment of a "remove item" screen.

FIG. 14 is a schematic of another embodiment of an input device for a generalized remote ordering apparatus.

FIG. 15 is a schematic of an ordering station for use with the input device of FIG. 14.

FIG. 16 is a schematic end elevational view.

DETAILED DESCRIPTION OF THE PREFERRED EMBODIMENTS

Figure 1:
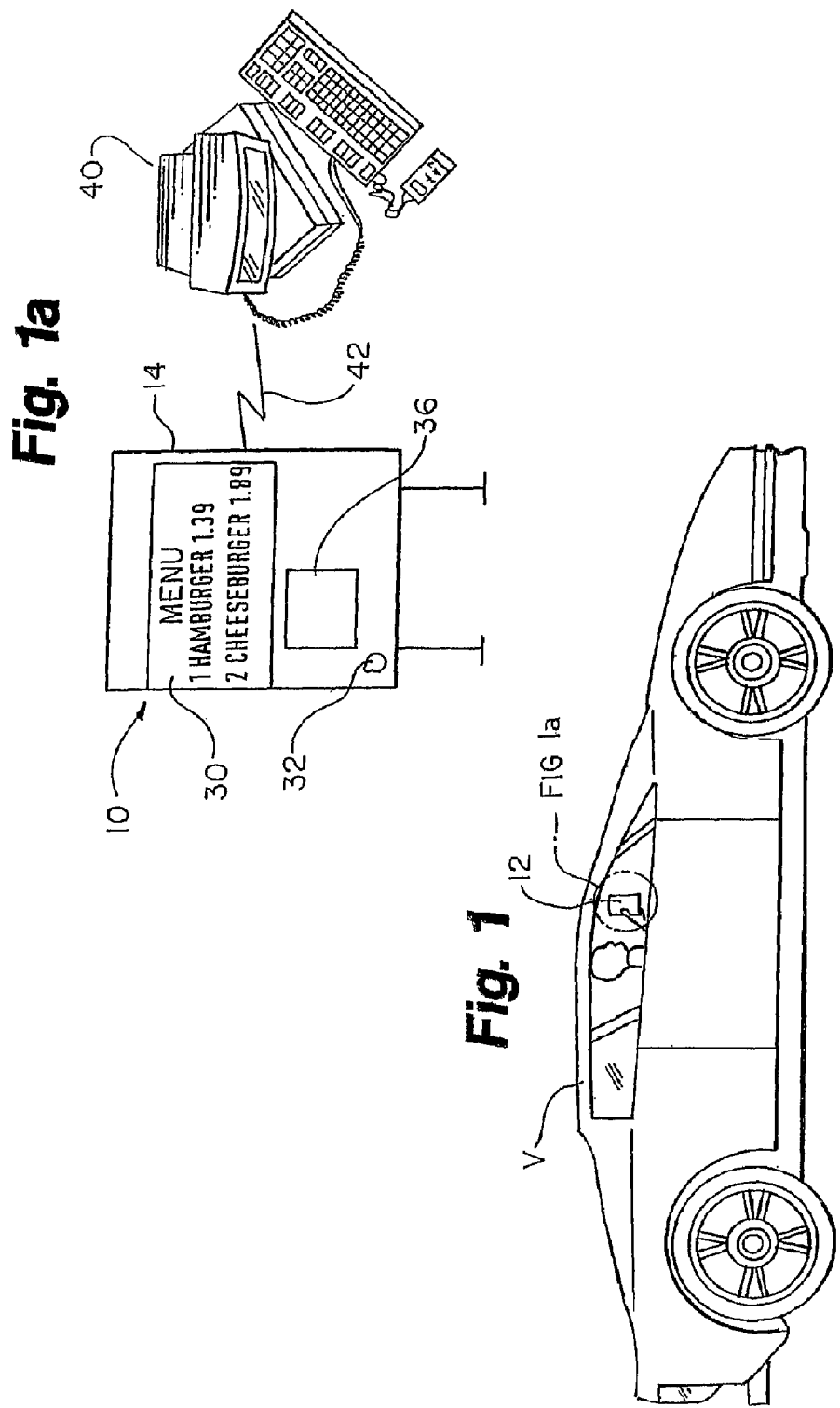
FIG. 1 is a schematic of the present invention shown in the context of a restaurant drive-through lane.

The remote ordering system for a restaurant drive-through lane of the present invention is generally designated in the Figures as reference numeral 10.

The remote ordering system 10 comprises an input device 12 and a drive-up ordering station 14. The input device 12 is unconnected to the drive-up ordering station 14, and the input device 12 is used from inside the vehicle V. Preferably, the input device 12 is handheld and is transportable away from the drive-up ordering station 14. Multiple input devices 12 may be used, with a separate device being assigned to each customer. In this embodiment the input device 12 is preferably used within direct line-of-sight of the drive-up ordering station 14. That is, it is not intended that the devices operate while greatly separated, as for example over a telephone network.

Figure 3:
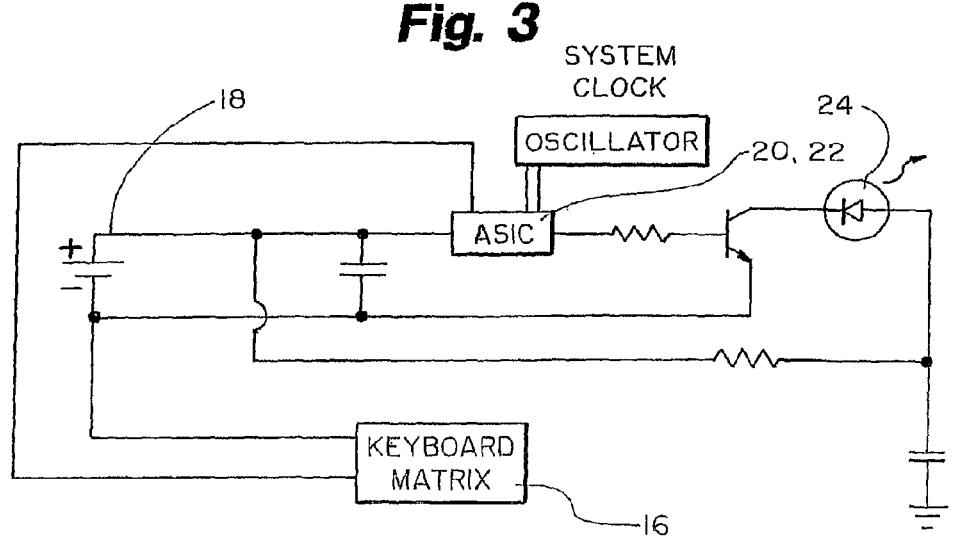
FIG. 3 is an electrical block diagram of the components of the remote hand-held device.

Preferably, the input device 12 has a keypad 16, battery 18, a first memory 20, a first processor 22 and a transmitter 24. The first memory 20 and the first processor 22 may be discrete components, or they may both be in an Application Specific Integrated Circuit (ASIC) as seen in FIG. 3. A customer identification number may be stored in the first memory 20 for transmission to the drive-up ordering station 14 with the order.

Figure 2:
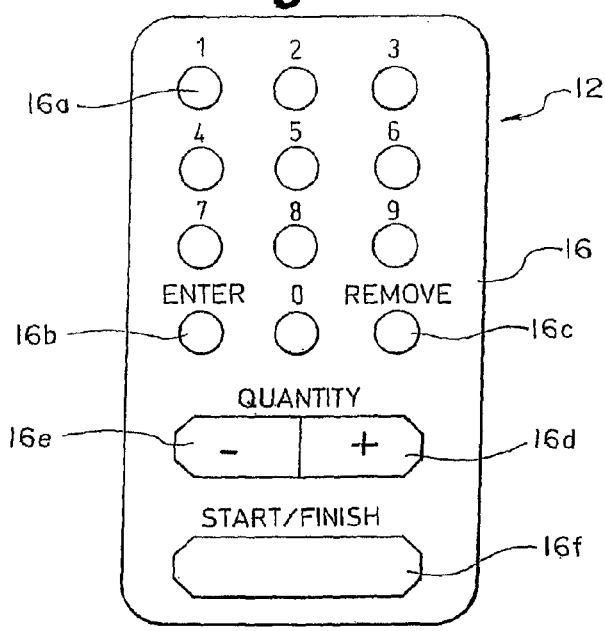
FIG. 2 is a schematic of the remote hand-held device of the present invention.

The keypad 16 further preferably comprises a number of numeric keys 16a, an enter key 16b, a remove key 16c, a quantity add key 16d, a quantity subtract key 16e, and a start/finish key 16f, as seen in FIG. 2.

The drive-up ordering station 14 has a posted visual menu 30, which has the description and order number of various food items. A receiver 32 is tuned to the transmitter 24. The station 14 also has a second processor 34 which is adapted to decode information received from the transmitter 24 through the receiver 32 and produce decoded information. The decoded information, for example, item description and price, is displayed on a display 36. A second memory 38 stores item numbers, descriptions, and prices which may be received from a point-of-sale system 40 through a communications link 42. The second memory 38 and second processor 34 may be discrete components, or they may both be in an ASIC as seen in FIG. 4.

The transmitter 24 and receiver 32 may operate either with radio frequency (RF) transmissions or with infrared (IR) transmissions.

Figure 5B:
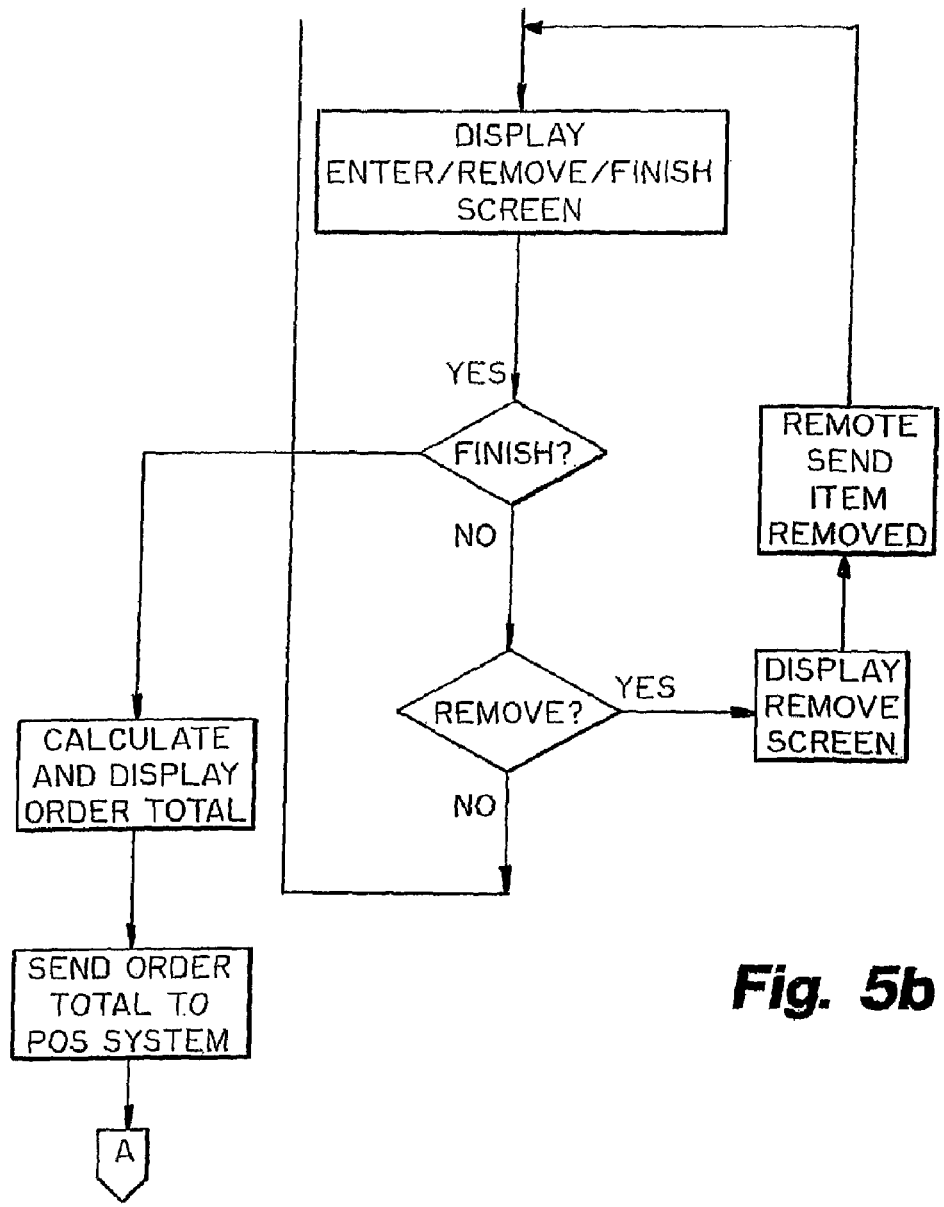
FIG. 5 is a flowchart of the data processing method of the present invention.
Figure 13:
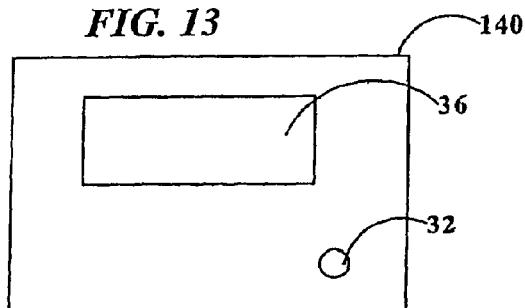
FIG. 13 is a schematic of an ordering station for a generalized remote ordering apparatus.

The remote ordering system 10 further comprises remote software executing in the first processor 22 and managing the input device 12; and ordering station software executing in the second processor 34 managing the ordering station 14. A flowchart of the remote software and ordering station software is shown in FIG. 5.

First, the ordering station software displays a "welcome" screen on the display 36. The welcome screen may invite the customer to initiate a transaction by pressing the start key 16f on the input device 12.

The customer then presses the start key 16f on the input device 12, causing a signal to be sent from the transmitter 24 to the receiver 32. The start signal is decoded by the ordering station software executing in the second processor 34.

In the next step, the ordering station software causes an "enter item number" screen (FIG. 6A) to be displayed on the display 36. The item numbers available to the customer will be shown on the posted menu 30 along with a description of the item (hamburger, cheeseburger, etc.) associated with the item number.

In response to the "enter item number screen," the customer presses one or more of the numeric keys 16a to input the item number (FIG. 6B). The customer then initiates transmission of the item number to the ordering station 14 by, for example, pressing the enter key 16b.

The item number is received by the receiver 32 and decoded by the ordering station software executing in the second processor 34. The ordering station software then associates the item number with an item description by looking in a table held in the second memory 38.

Next, the ordering station software sends an "item identifier and quantity" screen (FIG. 7) to the display 36. This screen invites the customer to enter the quantity of this item desired.

The customer inputs the quantity of this item desired by using the numeric keys 16a and optionally the quantity add key 16d and/or quantity subtract key 16e. The customer then initiates transmission of the item quantity by, for example, pressing the enter key 16b.

The receiver 32 receives the item quantity for the first item and passes this to the second processor 34 for decoding. The second processor 34 then makes an entry for the quantity of the first item in the second memory 38. The second processor 34 looks up the price of this item from a table maintained in the second memory 38 and calculates an item total for the first item. The ordering station software then transmits an item total screen (FIG. 8) for the first item to the display 36.

When the customer presses the enter key 16b again, a transmission signaling pressing of the enter key 16b is sent to the ordering station 14. The ordering station software then transmits an "enter/remove/finish" screen (FIG. 9) to the display 36.

The customer has three choices by which he may respond to the "enter/remove/finish" screen.

If the enter key 16b is pressed, the input device 12 signals the ordering station 14 to bring up an "enter item number" screen (FIG. 6A) to begin the process described above for ordering another item.

If the remove key 16c is pressed, the input device 12 signals the ordering station 14 to bring up a "remove item" screen (FIG. 11A). This screen will list the item(s) ordered by item number, description and quantity and display an order total. Optionally, the order subtotals may also be displayed (FIG. 11B). By using the numeric keys 16a, the customer indicates which item number to remove, then presses the enter key 16b to signal the ordering station software to remove that item from the order. The ordering station software then redisplays the "enter/remove/finish" screen.

If the finish key 16f is pressed, the input device 12 signals the ordering station 14 to calculate an order total for all items and quantities ordered. The ordering station software then causes an order total screen (FIG. 10) to be displayed on the display 36.

The ordering station software then sends the order information to the point-of-sale system 40 via the communications link 42.

The point-of-sale system 40 may load item numbers, descriptions, and prices into the ordering station 14 through the communications link 42.

Figure 12A:
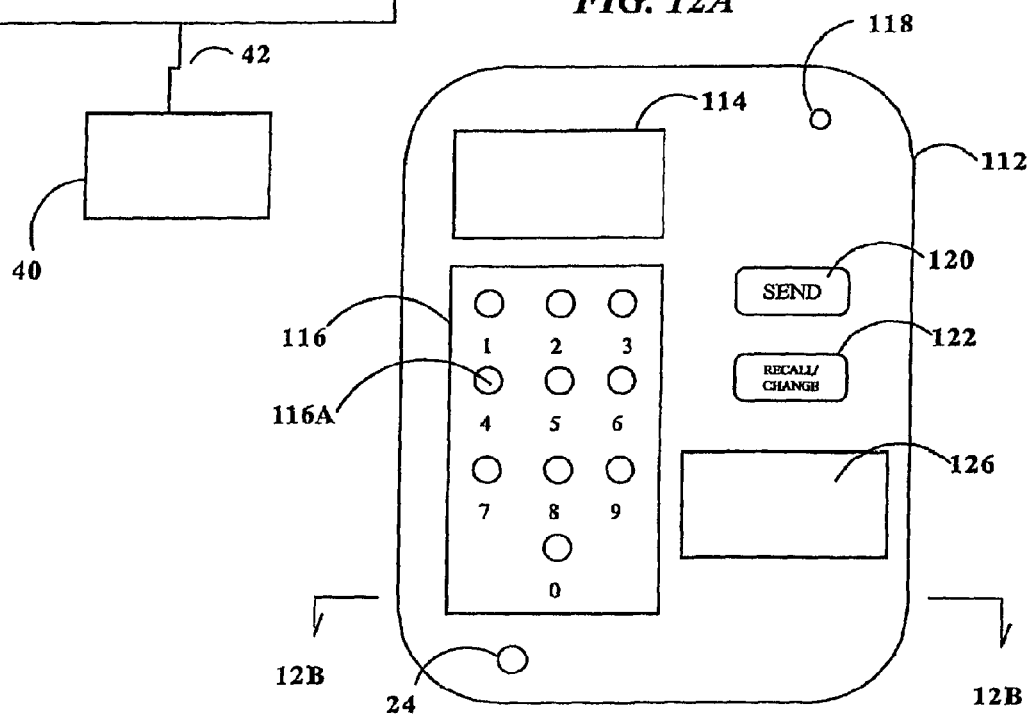
FIG. 12A is a schematic of an input device for a generalized remote ordering apparatus.
Figure 12B:
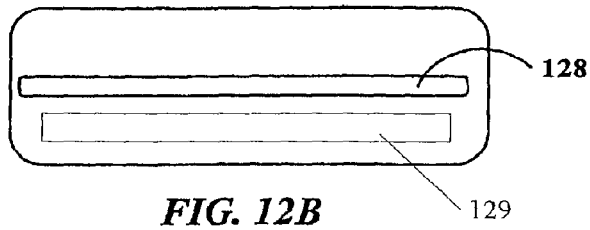
FIG. 12B is a schematic cross-section along the lines 12B of FIG. 12A.

A generalized remote ordering apparatus comprises an input device 112 having a keypad 116, a battery 18, a first memory 20, a first processor 22 and a transmitter 24 (see FIGS. 3 and 12A). The first memory 20 and first processor 22 may be discrete components, or they may both be in an ASIC as seen in FIG. 3. A user/server indicator may be stored in the first memory 20 for transmission to the ordering station 140 to identify the user/server.

The remote ordering apparatus further comprises an ordering station 140 unconnected to the input device 112, the ordering station 140 having receiver 32 tuned to the transmitter 24. The remote ordering station 140 also has a second processor 34, which is adapted to decode information received from the transmitter 24 through the receiver 32 and produce decoded information. The remote ordering station 140 also has a display 36 adapted to display the decoded information. A second memory 38 stores item numbers, descriptions, and prices, which may be received from a point-of-sale system 40 through a communications link 42. The second memory 38 and second processor 34 may be discrete components, or they may both be in an ASIC as seen in FIG. 4.

The input device 112 may have a display window 114 for displaying information. Preferably, the display window 114 is a liquid crystal display. The display window may be a computer screen or a display on a cell phone, PDA or other communications device. The display window 114 may have a menu for selecting goods or services. The selection can be made by a point and click system, a touch screen system, a stylus on the screen system or keying in data from the menu on the screen.

The input device 112 may have an order ready indicator 118 which is turned on by transmission from the ordering station 140 when an order is ready for pickup. Preferably, the order ready indicator 118 is a lighted indicator such as a light-emitting diode (LED), but could also be a chime or vibrator. Alternatively a message can be sent and displayed on the screen when the product or service is ready, or a message can be sent regarding the status of the order.

The keypad 116 preferably has a plurality of numeric keys 116A to input selections from menu items and customer data. Most preferably, the numeric keys 116A further comprise keys labeled 0 through 9, as shown in FIG. 12A. For example, a standard telephone keypad could be used as the numeric keys 116A.

The keypad 116 further comprises an order send button 120, which is pressed to transmit an order to the ordering station 140.

The keypad 116 further comprises a recall/change button 122 which can be used to recall or change a previously submitted order by entering the order number and pressing the recall/change button 122.

The input device 112 preferably has a credit card slot 128 for swiping a credit card to read the magnetic strip on the credit card. The input device 112 may also have a credit card signature block 126 adapted to electronically record the signature of a credit card holder.

A scanner 129 in the input device 112 can be used for scanning checks to use checks for payment through an automated clearing house using the Check 21 Act which allows a merchant to capture an image of a paper check and treat the image as an original instrument for deposit and processing through the Federal Reserve System. An electronic version of the check image may also be used as a substitute for scanning the check. Thus, checks and electronic versions of checks may be used to make payments by using the input device 112.

The transmitter 24 and receiver 32 may operate either with RF transmissions or with IR transmissions when communicating directly with the work station 140. Preferably, RF transmissions are used.

The remote ordering apparatus preferably comprises a plurality of the input devices 112, each of said plurality of input devices 112 being separately transportable away from the ordering station 140.

A customer of the service facility may place orders or acquire other information from the service facility by means of a method using the generalized remote ordering apparatus.

The service facility provides an order code to the customer who is using the input device 112, after correlating the order code to a predetermined order. For example, order code 1 could be correlated to a hamburger, fries and a coke. The user of the input device then enters the order code into the input device 112 by means of the keypad 116 and presses the order send button 120, which causes the order number to be transmitted to the ordering station 140. The user may operate the input device 112 either inside or outside the service facility, depending on the range of the transmitter 24.

To provide order codes to the general public, the owner of a store or service facility may post a menu of order codes on a World Wide Web page. For example, a user may go to the store or service provider web site and pull up the menu of order codes. If a retail store is having a special promotion, the store may post order codes for the sale items on its web site. The shopper then enters the order codes into the input device 112 and transmits them to the ordering station 140. With a two-way communications device having a screen or display, the user can select goods or services on the display by a point and click system, a touch screen system or a stylus on the screen to enter the desired order codes, or the user can manually enter the codes.

Alternatively, the service facility could also provide a catalog for use by a customer, with each customer being given an input device for shopping and the catalog having the order codes. The input device 112 could be programmed to accept a number of order codes and transmit them serially to the ordering station 140 with one press of the order send button 120. When the order is ready, the order ready indicator 118 will be turned on, and the customer may pick up the order.

In an alternative arrangement, the service facility may reveal an order code, on a web site or otherwise, only after verifying the identity of the requester, and may additionally require the requester to pay for the order with a credit card number before receiving the order code. In another arrangement, the requester pays for the order after entering it by swiping his credit card through the credit card slot 128, which transmits the credit card number and expiration date to the point-of-sale system through the ordering station 140. Further, an electronic payment can be made by scanning in a check on scanner 129 or presenting the electronic version of a check to the ordering station 140.

The input device 112 may be incorporated into a cellular telephone, so that orders may be transmitted to the service facility over the telephone network. Input device 112 may also be connected to the internet by Wi-Fi or by a cell phone network, which then contacts the work station 140 over a telephone network or though the internet.

Another embodiment of a generalized remote ordering apparatus is shown in FIGS. 14-16 as reference numeral 210.

The generalized remote ordering apparatus 210 comprises an input device 212 and an ordering station 240 unconnected to the input device 212.

The input device 212 further comprises a keypad 216, a battery (not shown), a first memory 20, a first processor 22, and a transmitter 224. The first memory 20 and first processor 22 may be discrete components or they may be in an ASIC as seen in FIG. 3.

The input device 212 also comprises a bar code reader 226 adapted to read bar code labels L. Alternatively the input device 212 may read RFIC tags to identify goods.

The ordering station 240 has a receiver 32 adapted to receive information from the transmitter 224. The ordering station 240 also has a second processor 34 which is adapted to decode information received from the transmitter 224 through the receiver 32 and produce decoded information. A second memory 38 stores item numbers, descriptions, and prices which may be received from a point-of-sale system 40 through a communications link 42. The second memory 38 and second processor 34 may be discrete components, or they may both be in an ASIC as seen in FIG. 4.

In one preferred embodiment, the input device 212 comprises a cellular telephone 250 and the receiver 32 comprises a telephone answering apparatus 242.

If the cellular telephone 250 is analog, the transmitter 224 will include a modem.

In other embodiments, the transmitter 224 and receiver 32 operate in the infrared spectrum or the radio spectrum.

Other communications routes from the input device 212 to the work station 240 include a cell phone as the input device 212 with a connection to the internet and the internet to the work station 240, a cell phone connection to a telephone system, the telephone system to the work station 240, a Wi-Fi connection to the internet from a PDA or computer as the input device 212 and an internet connection to the work station 240. Other combinations of input devices use a cell phone 250 with a PDA or computer to send messages over telephone systems or the internet to the work station 240.

The apparatus 210 may also have a GPS transceiver 260 that communicates with one or more GPS satellites S.

The apparatus 210 may also have a personal identification apparatus 270 adapted to identify the user of the input device 212. The personal identification apparatus 270 preferably is adapted to identify the user directly by some physical characteristic, instead of requiring the user to input a PIN. This provides additional security, because PINs can be stolen, but physical characteristics of the user cannot be copied.

The physical characteristic that may be used with the personal identification apparatus 270 may be any physical characteristic of the user, but preferably is selected from the group consisting of bioelectric, biochemical and biomechanical characteristics.

For example, the personal identification apparatus 270 may be adapted to identify the user's voice, the user's thumbprint or the user's retinal pattern.

Applications of the apparatus 210 may now be illustrated.

If the input device 212 is a cellular telephone 250 equipped with a bar code reader 226, the user may order an item from his home or car for later pickup at a store or restaurant. The store or restaurant may publish a menu of items with corresponding bar codes, either in print or on the World Wide Web. To order an item, the user would dial a central number at which the ordering station is located and the call would be answered by the telephone answering apparatus 242. A series of voice instructions would instruct the user to read the bar code using the bar code reader 226. The ordering station 240 would then communicate with the point-of-sale system 40 to record the sale. In addition, the customer may be required to swipe a credit card through the credit card slot 128, either at home or when at the store.

In another application, the GPS transceiver 260 would indicate the user's location, precise to within 3 meters, and the input device 212 would transmit this location to the ordering station 240 during the ordering process. A delivery person, equipped with another GPS transceiver, would input the GPS coordinates into his transceiver and would be able to go directly to the location at which the ordering user is located. This would be of great value in an environment such as a stadium.

Alternatively, a Wireless Application Protocol (WAP) can be used to locate the position of the caller for routing calls to the nearest provider or delivering the good or services to the user.

In another application, the user may place an order through the store or restaurant's World Wide Web site, using any standard ordering process. When the user arrives at the store or restaurant, the user may activate the input device 212 in order to indicate to the ordering station 240 that the user is present and ready to pick up the item.

In a still further application the user may call a central number to connect to a central computer which will offer a menu of all goods and services available for ordering by remote ordering systems. The central computer will then route the user to a particular order receiving computer or forward orders taken on the central computer. In this manner the user need only remember one number to call to enter the system no matter what goods or services are desired.

In another embodiment the user may call the receiving station phone number for a business and be connected to the central computer which processes the order and debits the customer's account, or credit card, or receives the image of a check from a scanner 129 or the electronic version of a check and then sends order data to a second computer at a location where the product or service is to be picked up or provided, instructing the local branch to provide the goods or services. Alternatively the central computer can send data to be viewed on a screen or printed, instructing the local branch to provide the goods or services. A printer can print labels, receipts or credit card slips directed by the central computer or an on-site computer. Inventory control data may be kept on the central, the local computer or both.

In the general case a user can access a receiving station 240 by use of a transmitter, a cell phone, preferably a cell phone with a data display screen 214, a PDA with a transmitter, a PDA with a cell phone, a PC with a transmitter, or a PC with a cell phone, a tablet PC with a transmitter, or a tablet PC with a cell phone. The transmissions may take place through the internet or a telephone system or be direct from the input device 212 to the work station 240. The transmissions of data can be by Wi-Fi, wireless personal networks or any other system and may use BLUETOOTH® or any other protocol. Thus an indirect wireless communication is established between the input device and the work station by use of an intervening internet and/or telephone network. All of the devices should have a display screen 214 for viewing information sent by the receiving station so that there is a two-way communication between the input device 212 and the ordering station 240. In this manner a point and click ordering system can be implemented. Alternatively a touch screen system or a stylus on the screen ordering system may be used to select goods and services. The keypad 216 or the bar code reader 226 can also be used to enter the data for ordering goods or services. Other means of entering ordering data may also be used including speech recognition software or numerical entries to voice prompted ordering menus.

The receiving station 240 can be a general service receiving station and forward calls or order data to other receiving stations for a particular business, which in turn can contact a receiving station or send a message to its own local branch directing the goods or services to be provided at the location where the customer wishes to pick up the goods or receive the services. The goods or services may also be delivered from the nearest local branch to the customer.

The receiving station 240 may be contacted at a central toll free phone number phone for taking orders and handling accounts and inventory data and then sending data to a local receiving station for filling the orders. Alternatively the receiving station 240 can be a central receiving station for the business with a nation wide toll free number and the local branches of the business that fill the orders can have a communications link to receive data for filling the orders. As part of the menu for ordering goods or services the user can select the location for pick up or designate a point of delivery.

There may be many uses for the receiving station 240. It can control other machines rather than simply provide goods or services. For example the receiving station 240 can be connected to a house to control heat, lock or unlock doors, turn on or off lights, etc. In other applications the receiving station 240 can be connected to an ATM machine for obtaining cash or making deposits, or to a bank computer for transferring funds between the user's accounts or paying bills. The scanned checks or electronic version of scanned checks can be used for one time payments through an automated clearing house, to authorized periodic payments or to authorize a monthly payment of a balance due on a specified date for a specific time period. Similarly, credit card payments may be made on a single or recurring payment.

The receiving station 240 may be in a vending machine, the venting machine may be in a kiosk. The receiving station 240 may also be in a home or a home appliance. If used with a vending machine, the vending machine can electronically accept payment from credit cards or debit cards rather than having money deposited. The vending machine or kiosk may sell insurance such as travel or flight insurance at airports, tickets to performances or sporting events, or for transportation such as airline, bus and train tickets. The vending machine may also be a self-service fuel pump at a service station.

The combination of the input device 212 and ordering station 240 may be used to summon taxis and (particularly when combined with the GPS in the input device 212) pay the fare, or to rent cars and provide keyless entry to the vehicle.

The input device 212 may also be used in conjunction with a receiving station 240 at a hotel to reserve a room, check in, obtain room service, pay the bill, operate the door locks on the hotel room and check out of the hotel.

The wireless telecommunications device may have a bioelectronic user identification device for transmitting user identification data to the receiving station. Alternatively receiving station 240 can receive identity data from a bioelectronic identification device at the point of pick up or delivery. Chips in the possession of the customer, such as chips imbedded in cards or tags, or even chips in the customer, can be used for identification.

The data input device 212 may have a chip reader for RFICs, which can be attached to products and entered into the data input device by being proximate the RFIC. A shopper in a store can have a data input device on a shopping cart and input the data on the input data device 212 by placing items with RFIC tags in the shopping cart. Alternatively a shopper can scan in the bar codes from the product with bar code reader 226 on input device 212 such that the goods selected can be inventoried and paid for while on the store premises. Alternately scanner 129 can be used for scanning checks for use in transmitting check information to an automated clearing house to transfer funds.

In the most general case the wireless ordering telecommunications device can connect people, appliances or computers to the ordering station and the ordering station may be connected to appliances, machines or computers.

In general the ordering station can send any type of information to the shopper, including directions on how to get to the store or directions in a store for where a good is located or the location of a pick up point, advertise specials, or provide other advertisements and useful information to the customer.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A remote ordering apparatus comprising,
a wireless two-way telecommunications device having a data entry portion, a display portion, a power source, a first memory, a first processor, a transmitter, a receiver and,
a data receiving station to send and receive data to and from the wireless two-way communications device indirectly, a second processor adopted to process data received by the data receiving station, a second memory adopted to store data and a data output device for directing the delivery of goods or services.

2. A remote ordering apparatus as in claim 1 having,
the wireless two-way telecommunications device is a cell phone using a telephone network to communicate with the data receiving station.

3. A remote ordering apparatus as in claim 2 having,
a PDA connected to the cell phone.

4. A remote ordering apparatus as in claim 2 wherein,
a computer connected to the cell phone.

5. A remote ordering apparatus as in claim 2 wherein,
a check scanner to scan in a check or an electronic check data representation in the wireless two-way telecommunications device stores check information for payment by check.

6. A remote ordering apparatus as in claim 5 wherein,
a connection from the data receiving station to an automated clearing house to process the check information.

7. A remote ordering apparatus as in claim 1 wherein,
the wireless two-way telecommunications device is a cell phone using a telephone and an internet network to communicate with the data receiving station.

8. A remote ordering apparatus as in claim 7 having,
a PDA connected to the cell phone.

9. A remote ordering apparatus as in claim 7 having,
a computer connected to the cell phone.

10. A remote ordering apparatus as in claim 7 wherein,
a check scanner to scan in a check or an electronic check data representation in the wireless two-way telecommunications device stores check information for payment by check.

11. A remote ordering apparatus as in claim 10 wherein,
a connection from the data receiving station to an automated clearing house to process the check information.

12. A remote ordering apparatus as in claim 1 having,
a Wi-Fi transmitter-receiver connected to the a wireless two-way telecommunications device to access data receiving station through the internet.

13. A remote ordering apparatus as in claim 12 having,
a computer connected to the Wi-Fi transmitter-receiver.

14. A remote ordering apparatus as in claim 12 having,
a PDA connected to the Wi-Fi transmitter-receiver.

15. A remote ordering apparatus as in claim 12 wherein,
a check scanner to scan in a check or an electronic check data representation in the wireless two-way telecommunications device stores check information for payment by check.

16. A remote ordering apparatus as in claim 15 wherein,
a connection from the data receiving station to an automated clearing house to process the check information.

17. A remote ordering apparatus as in claim 1 wherein,
a check scanner to scan in a check or an electronic check data representation in the wireless two-way telecommunications device stores check information for payment by check.

18. A remote ordering apparatus as in claim 17 wherein,
a connection from the data receiving station to an automated clearing house to process the check information.

19. A method for remote ordering comprising,
establishing a two-way wireless communications link between an input device having a display screen and a receiving station,
referring to a menu of items to be ordered from on the display screen,
entering the order on the input device,
transmitting the order from the input device to the ordering station,
recording the purchase made,
filling the order,
paying for the order by transmitting an electronic check.

20. A method for remote ordering as in claim 19 wherein,
scanning in a check image to create check data for paying for the order.

* * * * *